W. J. CONLON.
WRINGER REVERSING GEAR BOX.
APPLICATION FILED MAY 2, 1914.

1,238,745.

Patented Sept. 4, 1917.

Witnesses:
Leonard W. Novander
John A. Dienner

Inventor
Walter J. Conlon
By Brown, Hanson & Boettcher
Attys

UNITED STATES PATENT OFFICE.

WALTER J. CONLON, OF CHICAGO, ILLINOIS.

WRINGER-REVERSING-GEAR BOX.

1,238,745. Specification of Letters Patent. Patented Sept. 4, 1917.

Application filed May 2, 1914. Serial No. 835,792.

*To all whom it may concern:*

Be it known that I, WALTER J. CONLON, a citizen of the United States, residing at Chicago, in the county of Cook and State of Illinois, have invented certain new and useful Improvements in Wringer-Reversing-Gear Boxes, of which the following is a full, clear, concise, and exact description, reference being had to the accompanying drawings, forming a part of this specification.

This invention relates to gear boxes.

In certain classes of light machinery the cost of assembling the parts is the largest item in the cost of manufacture. A construction which will allow of a more convenient or speedy assembly will materially reduce the cost of manufacture.

One of the objects of the present invention is to improve the construction of gear mechanisms, or the like, which will allow of rapid and accurate assembly and will reduce the cost of manufacture.

The particular apparatus that I have chosen to illustrate my invention is a reversing gear mechanism, such as may be employed in connection with the gear mechanism described and claimed in my copending application, Serial No. 833,045, filed April 20, 1914.

A casing 1 is provided with bearings 2 and 3 at the top and bottom of the casing, respectively.

Figure 2:
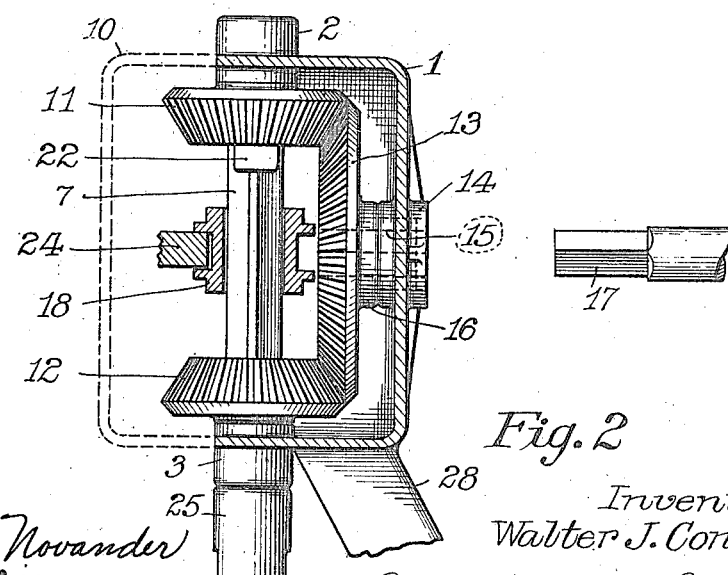
Fig. 2 is a side elevation of the same partly in section.

It will be seen from Fig. 2 that the bearings are integral with the casing and are in line with each other. A driving shaft having circular cylindrical portions 4 and 5 is arranged to rotate in the bearings 2 and 3, respectively. Intermediate the circular portions of the shaft is a squared portion 7. The shaft is divided into two parts at the junction of the squared portion and the lower circular portion where a union is made between the parts by the screw threaded socket 8 in the squared portion and a reduced threaded part 9 on the circular portion. Bevel gears 11 and 12 are borne on the circular portions 4 and 5, respectively, between the squared portion 7 and the bearings 2 and 3 of the casing. It can be seen that endwise movement of these pinions is prevented by the above arrangement. These bevel pinions 11 and 12 engage a driven bevel gear 13 which has a bearing 14 in the back part of the casing 1. The shaft or hub of the gear 13 is cut off next the end of the bearing 14 to allow of convenient assembly of the parts driven by said gear. This is accomplished by providing a square socket 15 in the hub 16 for coöperation with a squared shaft 17 to which the gear mechanism may be connected. It will be seen that the bevel pinions are loosely mounted on the shaft and are free to rotate thereupon.

Figure 1:
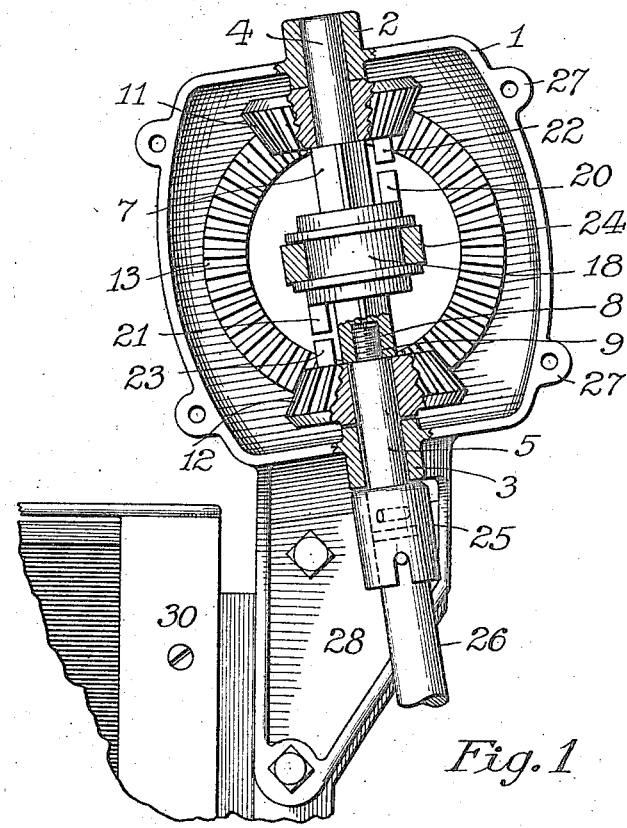
Figure 1 is an elevation with parts broken away of a gear box embodying my invention.

A clutch member 18 having projections 20 and 21 for engaging similar projections 22 and 23 mounted on the pinions 11 and 12, respectively, is slidable on the squared portion 7 of the driving shaft. This clutch 18 may stand in a neutral position as shown in Fig. 1, or it may be moved upward to clutch the driving shaft 7 with the pinion 11 and to drive the gear 13 in one direction or the clutch member may be thrown into the lower position to clutch the shaft and the lower pinion 12 and thus to drive the gear 13 in the opposite direction. Shifting of the clutch may be accomplished in any preferred manner, as by a shifting fork 24. The cylindrical shaft 5 may be provided with a coupling 25 which is pinned to the end thereof, and may be adapted for coöperation with a driving shaft 26.

The casing 1 may be provided with a cover 10 to protect the parts. The cover 10 may be secured to casing 1 by means of bolts and lugs 27 and the entire mechanism may be supported by a bracket 28 bolted to any convenient support or part of machine 30. The use of the above described mechanism as a reverse gear is apparent and will not be further described.

In assembling the various parts of mechanism, the gear 13 is placed with its hub 16 in the bearing 14, the clutch 18 is slipped on the squared portion 7 of the driving shaft, the bevel pinion 11 is slipped on the cylindrical portion 4 and these three parts, bevel placed in the casing 1 with the cylindrical portion 4 of the shaft sliding into the bearing 2. The pinion 12 is placed in the casing and brought into register with the bearing 3. The stub shaft 5 with the socket or coupling 25 attached is then inserted in the bearing 3 and the threaded portion 9 is screwed into the socket 8. The assembly of the parts is then complete. In view of the fact that the shaft 26 turns only in one direction and that the reversing of the gear 13 is secured by clutching the different pinions, it can be seen that there is no opportunity for the parts to become separated as the same are all locked by the engagement of the screw 9 with the socket 8. By the arrangement of the coupling 25 and the squared recess 15 in the hub of the bevel gear 13, further assembly to other operating parts may readily be made. It can be seen from the above description that I have provided a structure of the utmost simplicity and ease of assembly. The parts may be manufactured cheaply and may be easily assembled. The structure is self-contained and all bearings are suitably formed in a single casting so that the proper alinement is insured. An interlocking of the parts is also secured in that the attachment of the last element retains all the other elements in a locked position and it is impossible to dismantle the device without first unlocking the same by removing the last assembled element.

Instead of employing a squared portion 7, a shaft of any preferred cross section suitable for driving the clutch member 18 may be employed, it being essential only that the same be enlarged with respect to the bearing portion 4 and 5 so as to provide shoulders for preventing endwise movement, both of the shaft itself and of the pinions 11 and 12. It is also apparent that the portions 5 and 7 of the sectional shaft may be connected by other means than socket and screw threads.

This device is especially adapted to be used on wringers attached to electric washing machines. The wringer rolls are required to run in either direction and the present device is a convenient means for reversing the same.

The invention above described is not limited to the specific embodiment disclosed but may be applied in other relations and to other pieces or parts of apparatus and I do not desire that the invention be limited to any of the details above described except as the same may be embodied in the appended claims.

What I claim as new and desire to secure by Letters Patent of the United States is:

1. In a mechanism of the class described, a hollow unitary casing, a shaft member having a circular bearing portion and a squared portion, said squared portion having a screw threaded socket therein, a second shaft member having screw threads to engage said socket and having a bearing portion, said shaft members projecting through and having bearings in two sides of said casing, driving gears loosely mounted on said bearing portions and held against endwise motion between said squared portion and said casing, a clutch slidably mounted on said squared portion and adapted to connect said gears with said shaft members, a driven shaft, and a gear on said driven shaft constantly meshing with said first named gears.

2. In apparatus of the class described, a casing, a driving shaft projecting through and having bearing portions in said casing and an enlarged portion between said bearing portions, a driving member mounted on one of said portions, a screw threaded joint between said enlarged portion and one of the bearing portions, and a driven member operatively connected with said driving member.

3. In a mechanism of the class described, a unitary casing provided with bearings, a driving shaft projecting through and having bearings in said casing, said shaft comprising a rectangular portion and two circular bearing portions, driving pinions loosely mounted on said circular portions and held against endwise motion between the casing and the rectangular portion, and a sliding clutch member mounted on said squared portion and sliding into engagement with said pinions, a driven shaft, a gear on said driven shaft meshing with said pinion, and a detachable joint between one of said circular portions and the rectangular portion.

4. In combination, a driving shaft having a circular portion and a non-circular portion, a pinion on said circular portion, a clutch member on said non-circular portion for engaging said pinion, an intermediate shaft, a gear on said intermediate shaft meshing with said pinion, and an independently supported driven shaft having a squared end extending into an axial pocket in said intermediate shaft.

5. In combination, a casing, a driving shaft bearing in said casing and having a circular portion and a non-circular portion, a pinion on said circular portion, a clutch member on said non-circular portion for engaging said pinion, an intermediate shaft bearing in said casing, a gear on said intermediate shaft meshing with said pinion, and an independently supported driven shaft having a squared end extending into an axial pocket in said intermediate shaft.

6. In combination, a casing, a driving shaft bearing in said casing and having circular portions and a non-circular portion, a pinion on each of said circular portions, a clutch member on said non-circular portion for engaging either of said pinions, an intermediate shaft bearing in said casing, a gear on said intermediate shaft meshing with said pinions, and an independently supported driven shaft having a squared end extending into an axial pocket in said intermediate shaft.

In witness whereof, I hereunto subscribe my name this 21st day of April, A. D. 1914.

WALTER J. CONLON.

Witnesses:
LEONARD W. NOVANDER,
JOHN H. DIENNER.

Copies of this patent may be obtained for five cents each, by addressing the "Commissioner of Patents, Washington, D. C."

Corrections in Letters Patent No. 1,238,745.

It is hereby certified that in Letters Patent No. 1,238,745, granted September 4, 1917, upon the application of Walter J. Conlon, of Chicago, Illinois, for an improvement in "Wringer-Reversing-Gear Boxes," errors appear in the printed specification requiring correction as follows: Page 2, top of first column, insert as line 1 the words and reference-numerals *pinion 11, clutch 18 and shaft 7, are then;* same page, strike out line 66; and that the said Letters Patent should be read with these corrections therein that the same may conform to the record of the case in the Patent Office.

Signed and sealed this 25th day of September, A. D., 1917.

[SEAL.]

F. W. H. CLAY,
*Acting Commissioner of Patents.*

Cl. 74—59.